2,503,216

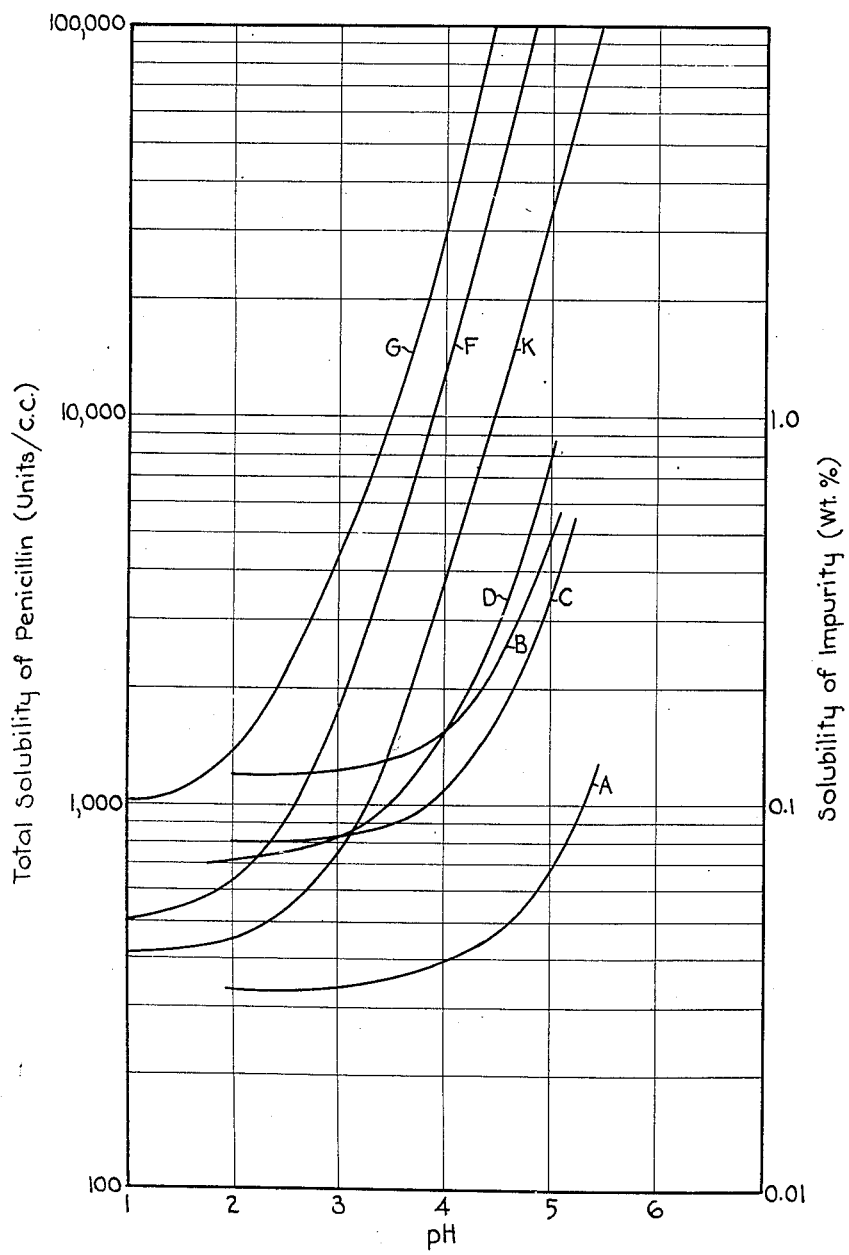
Solubility-pH Curves for Penicillins F, G, and K, and for Impurities A, B, C, and D in aqueous solution
Inventors: Gino J. Pierotti
Raymond A. Wilson
Elmer A. Anderson Patented Apr. 4, 1950

UNITED STATES PATENT OFFICE 2,503,216

PURIFICATION OF PENICILLIN

Gino J. Pierotti, Albany, and Raymond A. Wilson and Elmer A. Anderson, Berkeley, Calif., assignors to Shell Development Company, San Francisco, Calif., a corporation of Delaware Application July 2, 1946, Serial No. 681,068

3 Claims. (Cl. 260—302)

This invention relates to a process for the purification and concentration of penicillin. More particularly, it pertains to an improved process for the separation of constituents of a fermentation broth, produced in the preparation of penicillin, to effect separation of penicillin from associated impurities and further to obtain separate recovery of different forms or species of penicillin.

Penicillin, in the broad and generic sense, is an organic acid which possesses remarkable bacteriostatic activity. In this generic sense, it is produced during the growth of certain molds such as *Penicillium notatum*. By virtue of its antibiotic activity, it is an important pharmaceutical material for combating many diseases and preventing the spread of infection.

In the earlier work on penicillin, the general conditions for its production by mold growth were determined, its general solubility characteristics and stability were established, and a general process for its recovery from the fermentation broth and its concentration was developed. This process comprised essentially (1) extraction of the fermentation broth at a pH of about 2 with amyl acetate, which resulted in a certain amount of purification, (2) extraction of the amyl acetate extract of penicillin at a pH of about 7 to 8 with an alkaline material thus effecting further purification as well as some concentration, the penicillin being transferred to the aqueous phase as the soluble salt, (3) extraction of the aqueous extract, again at a pH of about 2, with chloroform to effect still further purification, and (4) extraction of the chloroform extract with an alkaline solution to once again put the penicillin in an aqueous solution as the desired salt, this operation being followed by a drying process designed to effect water removal under conditions which would not seriously affect the activity of the penicillin.

Demands for penicillin in increasing quantities and of proprietary preparations of it for use having higher and higher activity, without regard to cost, during the recent war period, resulted in rapid developments in the preparation of penicillin, including the development of new strains of molds and improved culture media for the fermentation. As a result of the great activity in the field of producing penicillin (in the fermentation broth), larger overall concentrations of penicillin in the broth are now obtained, requiring modifications in recovery procedure to effect the same percentage recovery of available penicillin; recognition of different forms of penicillin has resulted, the relative proportions of the different forms having been materially altered in some cases, thus requiring modifications in recovery procedure to effect the most satisfactory recovery, including the separation of more active from less active forms of penicillin; and production and recognition of impurities with many physical and chemical characteristics very similar to those of penicillin, necessitating modified procedures for their effective separation from penicillin.

As indicated above, intensive work on penicillin (the penicillins) has led workers in the field to believe that there are at least four different antibiotic substances which come under the broad term penicillin, and that each of the four substances may be represented by the empirical formula $C_9H_{11}O_4SN_2 \cdot R$. The differences in the four penicillins are attributed to the R radical which is different for the different species. In accordance with an article on the Chemistry of penicillin in "Science," December 21, 1945, R in the different penicillins is as follows: Penicillin F, R is $\Delta^2$-pentenyl ($-CH_2 \cdot CH = CH \cdot CH_2 \cdot CH_3$); penicillin G, R is benzyl ($-CH_2 \cdot C_6H_5$); penicillin X, R is para-hydroxybenzyl ($-CH_2 \cdot C_6H_4 \cdot OH-p$), penicillin K, R is n-heptyl ($-CH_2(CH_2)_5 \cdot CH_3$). Two suggested structural formulas of penicillin are as follows:

1. B-lactam structure (as sodium salt)

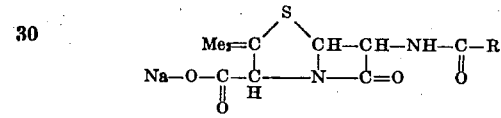

2. Incipient azlactone structure (as sodium salt)

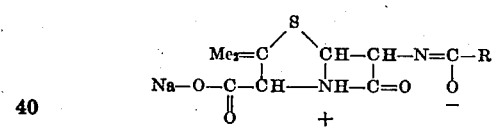

(Me represents the methyl group)

Whereas, it is readily appreciated that the physiological characteristics of benzyl ($C_7$) and n-heptyl ($C_7$) substituted compounds, such as penicillins G and K, may be quite different, it would be expected that their physical properties, such as relative solubilities, etc., would be similar enough to make their separation, one from the other, a matter requiring considerable ingenuity surpassing ordinary skill in the art.

Furthermore, to complicate matters even more, it has been discovered that the normal broth resulting from the preparation of penicillin by fermentation contains impurities in considerable proportion, these impurities being extracted by solvents such as amyl acetate under the conditions of extraction of penicillin. These impurities may be classified in four main groups or classes depending upon their extraction characteristic from aqueous solution by different solvents, and upon their pK values. Furthermore, the acid dissociation constants (K) and solvent/water distribution ratios are so closely related to those of the various penicillins as to make their effective separation from the penicillins a very difficult matter. Still further, oftentimes when first aqueous extracts are extracted with solvents, such as chloroform, in the subsequent purification and concentration operations difficultly resolvable emulsions are produced, apparently as the result of precipitation of solid material from solution under the conditions of extraction. This phenomenon is particularly serious when the starting broth is one of unusually high potency and/or when a prior pre-concentration operation has been utilized to preconcentrate the penicillin. One reason for this is the fact that improved fermentation methods for producing broths having higher potencies also result in broths having proportionately higher concentration of non-antibiotic substances. This is also true of pre-concentration operations.

It is an object of this invention to increase the recovery of penicillin from its fermentation broth, and to improve the separation of penicillin in fermentation broth from non-antibiotic substances associated therewith. A primary object is to improve the purification of penicillin, particularly penicillin G. Another object is to improve the purification of penicillin G by removing the weaker penicillin K therefrom. Still another object is to improve the separation of penicillin from impurities normally associated therewith in the first organic solvent extract produced from a penicillin-containing fermentation broth. A further object is to reduce the precipitation of solids during extraction operations employed for the purification of penicillin. A still further object is to reduce the formation of relatively stable emulsions during operations designed to effect a purification and/or concentration of penicillin by contacting it simultaneously with two at least partially immiscible liquids. Other specific objects will be apparent from the description of the process of this invention as given hereinafter and in the claims.

Now it has been discovered that the recovery and the purification of penicillin from aqueous extracts of penicillin, which extracts contain impurities normally associated with penicillin in a first organic solvent extract of a penicillin-containing fermentation broth, are improved by acidification of the aqueous extract to a pH not higher than about 5.5, thereby precipitating a substantial proportion of the dissolved impurities, and thereafter separating the solid material from the acidified solution.

More specifically, it has been discovered that a substantially neutral or an alkaline aqueous solution containing penicillin and sufficient impurities to substantially saturate the aqueous solution at a pH of about 4.5–5.5 can be advantageously treated by acidifying the solution to a pH of about 5.5 or less, say 4.5 or 4.0 thereby precipitating a substantial proportion of the impurities, separating the precipitate from the solution by filtration, sedimentation, centrifugation, etc., and thereafter effecting further purification and concentration of the penicillin by solvent extraction at a suitable pH, etc.

The practice of the present invention effectively removes a substantial proportion of the impurities and simultaneously reduces, and oftentimes substantially eliminates, the formation of relatively stable emulsions during subsequent extraction operations, which emulsions are usually formed during subsequent extraction steps.

It has also been discovered that by acidifying an aqueous solution of penicillin, such as may be represented by a first aqueous extract, to a selected pH value of from about 3 to about 5.5, preferably from about 3.5 to about 4.5, depending upon the concentrations of the impurities and of the various forms of penicillin present in the solution, a substantial proportion of the weaker penicillin K can be removed along with the precipitated impurities with a consequent increase in the differential potency of the remaining solution. In this sense, penicillin K may be considered as an impurity of penicillin G.

This invention will be more fully understood with reference to the accompanying drawing wherein a series of curves show the solubility-pH relationships of penicillins F, G and K and of impurities designated A, B, C, and D, in aqueous solutions.

Referring to the drawing, curves F, G and K show the solubilities of the penicillins F, G and K in water at various hydrogen ion concentrations. The hydrogen ion concentrations are expressed in terms of pH values. The total solubilities (ionized and unionized) of the penicillins are represented by the ordinates and are expressed as Oxford units per cc. designated on the left. Curves A, B, C, and D show the solubilities of impurities A, B, C, and D at different pH values, the solubility values being represented on the ordinate in weight percent of impurity in water, designated on the right.

The penicillins as well as impurities A, B, C, and D are all organic acidic substances. This would lead one to expect as a first generalization that the solubility —pH relationships would be similar in character. However, it has been discovered that this is true only for a pH value greater than about 5.5. Reference to the curves shows that with a decrease in the pH from, say about 5.5 to about 4 to 4.5, the solubilities of the penicillins and of the impurities in aqueous solution rapidly decrease. However, at a pH of about 4 to 4.5, the solubility vs pH curves for the impurities begin to flatten out rapidly but the corresponding curves for the penicillins do not flatten out so rapidly. This phenomenon allows desired separations at selected pH values of the aqueous solution.

Heretofore, first aqueous extracts having penicillin potencies no higher than about 8000 units/cc., and oftentimes no higher than about 5000 units/cc., have represented about the upper limit of concentration which could be subjected to further acidified solvent extractions without experiencing the formation of relatively stable emulsions. This has been true because the concentration of the impurities has been proportional to the concentration (potency) of the penicillin and at a potency of about 5 to 8 thousand units/cc. the solution has usually been near the impurity-saturation concentration for subsequent extraction conditions. In general, the total concentration of impurities A, B, C, and D in a first aqueous extract having a potency in the order of 10,000 Oxford units/cc. is in the order of about 0.005 gram (0.5 weight percent). In general, the total of these impurities is made up of about one fourth A and B combined, one-half C, and one-fourth D. It will be understood that both the total and the ratios of the impurities may vary considerably depending on fermentation conditions and previous operations.

Now, in the practice of the present invention, and as will be seen by reference to the curves of the accompanying drawing, a substantial proportion of the impurities is precipitated and separated from the solution by acidifying to a pH of, say, 4, without precipitation of penicillin G, even if the G is present in a concentration of as high as about 20 to 30 thousand units/cc. The impurities remaining in the solution are effectively separated by subsequent extraction operations without the formation of solids and resulting emulsification.

The improvement in the purification of penicillin which is the present invention, will be more fully understood from the following description of an application of that improvement described in connection with a description in general terms of a normal process for the recovery and purification of penicillin. For purposes of clarity the process may be divided into the following parts: (I) Preliminary treatment; (II) Main solvent extraction; (III) First aqueous extraction; (IV) Acid-precipitation and removal of impurities; (V) Solvent extraction of penicillin, and (VI) Recovery and concentration.

Inasmuch as this process involves several extractions, the nomenclature for identifying various extracts is complicated. To clarify matters, an extract produced for example with solvent S will be called "solvent-S-extract"; one produced by water treatment of a solvent solution will be called "aqueous extract"; etc. The same solvent may be utilized in different steps of the process or different solvents may be utilized, depending upon the requirements of the respective steps of the process. Furthermore, in order to simplify the description of the process, the various penicillins F, G and K and the various impurities A, B, C, and D as already characterized hereinabove, will be referred to oftentimes by the use of the respective letters alone.

I. Preliminary treatment

Penicillin may be produced from different types and/or strains of mold growth grown in and/or on appropriate culture media. From the culture of the mold there is obtained an aqueous solution containing varying amounts of solids and various different organic substances, and from about 50 to about 1000 Oxford units per cc. of solution or broth (see article by Florey and Jennings in British Journal of Experimental Pathology, vol. 23, page 120, June 1942). Penicillin acid decomposes very easily at temperatures slightly above 0° C. Strong acids, strong bases, heavy metals, and certain other reagents destroy it. Accordingly, this entire extraction process is carried out as closely to 0° C. as possible without freezing the water present. All acids or bases introduced to control the pH values throughout the process are added in dilute aqueous solutions, and extractions in even dilute acids and bases are carried out as rapidly as possible.

The fermentation broth is chilled to just above its freezing point, i. e. about 0° C. It is then filtered, and/or centrifuged, and/or otherwise treated to remove solid material, to produce a clarified broth. The clarified and chilled broth is then acidified to a pH of from about 2.0 to about 3.5 in order to insure the presence of the penicillin in the solution in the form of the free (unionized) acid, which is soluble in the solvent employed in the following extraction step. The acidifying acid should be an inorganic acid which is not soluble in the solvent, such as sulfuric or phosphoric acid, and should be employed in aqueous solution at such strength that the volume required to bring the broth to the desired pH level will not excessively dilute the broth. If desired, a demulsifying agent may be added to the acidified broth to aid in the subsequent separation of the aqueous and solvent phases in the main extraction step.

II. Main extraction

The acidified and clarified fermentation broth is next extracted with a solvent S, such as amyl acetate. The solvent-to-feed ratios used in this first extraction are usually between about 2:1 and 1:5, although higher or lower ratios may be employed. The extraction may be performed continuously or intermittently, and it may be effected by a counter-current contacting method, a method involving the use of combinations of mixers and settlers, combinations of these two methods, and/or other methods applicable to the contacting and separation of two substantially immiscible liquids with the transfer of a third component from one of the two liquids to the other liquid. It is desirable to carry out this extraction in such a manner, or to supplement it with an additional step, whereby the solvent-extract is washed with water maintained at a pH of between about 2.0 and about 3.5, preferably between 2.5 and 3.0. If distilled or demineralized water is employed, the pH will normally adjust itself at about the proper value. However, if water containing base minerals is employed, it will generally be advisable to add a small amount of acid to or with the water.

III. First aqueous extraction

The water-washed solvent-extract, comprising penicillin and other acids (impurities) dissolved in the solvent, is next extracted and concentrated with dilute aqueous base. The extracting aqueous base preferably has buffering capacity and is an inorganic compound. However, by employing countercurrent contacting with aqueous solution with multiple points of base-injection into the extraction-contacting zone, or by the use of a properly coordinated multiple-stage mixer-separator method with judicious proportioning of the base to the separate stages of contacting, ordinary strong inorganic bases (e. g. NaOH) in relatively dilute solutions may be utilized in this extraction step without unduly deactivating the penicillin.

The purposes of this extraction step are to concentrate the penicillin in an aqueous phase and to separate acid impurities which are substantially weaker than penicillin and which have been dissolved from the fermentation broth by the solvent. The aqueous base solution causes a larger proportion of the penicillin and of the stronger acids to become ionized than of those acids substantially weaker than penicillin. Since the ions and ionic salts of these organic acids are more soluble in water than in the solvent, they are extracted into the aqueous phase. As a result, a further preliminary purification is effected.

The following are illustrative examples of suitable aqueous bases: Ca, Sr, Ba hydroxides, and Na and K hydroxides, carbonates, bicarbonates, phosphates, citrates, tartrates and the like. The aqueous base usually contains between about 0.2% and about 2% by weight of the alkaline compound; the amount of aqueous base solution employed is usually between about ¼ and ½ the volume of the solvent-extract thus effecting a 2-fold to 4-fold concentration. This amount of the aqueous base should be such as to result in an aqueous extract having a pH of from about 6 to about 8.

IV. Acid-precipitation and removal of impurities

As already pointed out, the first aqueous extraction of the preceding step effects some separation of the penicillin from organic acid impurities possessing smaller acid dissociation constants. However, the first aqueous extract contains impurities in amount in the order of the same weight as that of the penicillin. As pointed out earlier, it has been discovered that the non-antibiotic substances, which substances constitute the principal impurities in the first aqueous extract and which amount to about 50% of the total solid content in this extract, may be classified into four classes of substances. They have been designated herein as A, B, C, and D. With reference to the curves in the accompanying drawing, it has been pointed out already that it is possible to materially reduce the solubility of these impurities in aqueous solution by reducing the pH of the solution to a value below about 4.5, and preferably to about 3-3.5. In this manner the solubility of the impurities may be materially reduced with consequent precipitation of a substantial proportion of these impurities from the first aqueous extract. It will be understood of course that the same method may be applied to an aqueous solution containing penicillin and such impurities obtained from any other source or at any other stage of a penicillin purification process.

Reference to the curves shows, for example, that at a pH of about 4 the solubility of penicillin G alone is about 30,000 units/cc. On the other hand, the average solubility of impurities B, C and D is about 0.13%. Furthermore, a reduction of the pH to about 3.5 reduces the solubility of the impurities to values only slightly lower than those at a pH of about 4; however, the solubility of penicillin G is decreased about three-fold to a value of about 10,000 units/cc. It will be understood, therefore, that the pH to which the solution is adjusted will depend upon the concentrations of the various forms of penicillins, the concentrations of the impurities, the degree of purification desired, the percentage recovery of penicillin (of any one or all forms) desired, the desired separation of the different penicillin species, etc. Thus, for the highest purity of penicillin G, acidification of the aqueous solution to a pH of about 2.5-3 produces about a maximum of precipitation of the impurities as well as of penicillin K. Of course, this purity is obtained at a sacrifice of recovery. Reference to curves G and K also shows that at a pH greater than about 3 the ratio of K to G in a solution which is saturated with respect to each of them is about 0.15-0.18. Therefore, when the ratio of K to G is greater than about 0.18 (expressed as units K/cc. to units G/cc.) proper acidification will result in precipitation of K before the point of saturation with respect to G has been reached.

The following examples are illustrative of the separation between penicillin G and penicillin K that may be obtained by an application of the present invention.

*Example 1.*—An aqueous solution having a potency of 10,000 units/cc. of penicillin, 6000 units of which was G and 4000 units of which was K, was acidified to a pH of 3.2 with the resultant formation of a precipitate. After filtration of the solution to remove the precipitate, the filtrate was analyzed. This analysis showed the filtrate to have a potency of about 7,000 units/cc., about 86% of which was determined by differential assay to be penicillin G. This represented a recovery of approximately 100% of the penicillin G, and a removal of about 75% of the penicillin K from the G. Concomitant with the precipitation of penicillin K there was precipitation and separation of non-antibiotic bodies with a substantial reduction in the total solids content of the aqueous solution.

*Example 2.*—An aqueous solution having a potency of 20,000 units/cc. of penicillin, about 8,000 units of which was G, about 8,000 units of which was K, and about 4,000 units of which was F, was acidified to a pH of about 3.4. A precipitate was formed which was separated by filtration. Analysis of the filtrate showed substantially complete recovery in the filtrate of the penicillins G and F and a reduction of the penicillin K to about 1250 units/cc. A large proportion of the precipitate was found to be non-antibiotic in character. Since substantially the total antibiotic activity was accounted for in the filtrate and in the separated precipitate, the non-antibiotic material in the precipitate represented impurities and not simply penicillin which had been deactivated by the operations of the process.

It will be understood that various modifications of conditions for effecting separations in accordance with the invention may be utilized and that the optimum combination of operating conditions to be utilized to effect separations between the different forms of penicillin and/or separations between the penicillins and the impurities will depend on the particular results desired, the relative concentrations and actual concentrations of the different substances involved, etc., as already referred to hereinabove.

V. Solvent extraction of penicillin

The separated filtrate from the acid-precipitation purification step is next solvent extracted with a solvent such as chloroform at a low pH, preferably from about 2 to about 3.5, whereby the penicillin is dissolved in the solvent, and acid impurities in the filtrate which are more strongly acidic than the penicillin are retained by the aqueous solution. This extraction may be made with a single solvent or a mixture of solvents, and it may be carried out in a substantially continuous countercurrent operation, or in an intermittent manner with single or multiple stage mixer-separator combinations, or combinations of both. In general, it is preferred to effect the extraction in such a manner as to maintain a pH gradient throughout at least a portion of the extraction zone, which gradient is more favorable for the desired separation than is the natural pH gradient tendency in a simple counterflow contacting process by a solvent and an acidified aqueous solution. This may be done by judicious addition of the acid to the extraction zone at a multiplicity of points. The separated solvent phase contains the penicillin and the aqueous phase contains the acids stronger than penicillin. It will be understood that a separation of the stronger from the weaker penicillin acids may be effected at this stage by proper control of the conditions of the extraction. Thus, the weaker penicillin K may be first selectively extracted by the solvent at a selected acidity, and the stronger penicillin G may be separated from the impurities by a subsequent extraction with another portion of the same or an equivalent solvent at a lower pH than was utilized for the extraction of the penicillin K.

VI. Recovery and concentration

The solvent-extract of penicillin from the preceding operation may, if desired, be subjected to treatment with an absorbent such as charcoal or the like to effect removal of color bodies and/or the removal of small amounts of other impurities. This decolorizer may be an absorber column or a mixer followed by a settler, centrifuge, or filter apparatus. The penicillin is then extracted from the solvent extract of it with an aqueous alkaline solution to form the alkaline metal salt of penicillin in an aqueous solution having a pH of about 7, and preferably between 6.5 and 6.9. This second aqueous extract generally contains penicillin of high purity in a concentration manyfold greater than that of the initial fermentation broth. If desirable, the aqueous extract may be subjected to a further acid precipitation. If this is done it is necessary to make another solvent extraction and aqueous extraction to remove the inorganic acids and salts that have been added. The aqueous extract is then evaporated as quickly as possible under a vacuum of at least about 10 mm. of Hg pressure absolute and at a temperature of not above about 10° C. In this operation between about 75% and about 95% of the water is evaporated and removed. The resulting evaporated aqueous solution is ready for use, packaging, drying or other treatment as may be desired.

Solvents

The organic solvents and mixtures thereof utilized for the purification and recovery of penicillin must be of a different density (preferably at least 10% different density) from the aqueous phases with which they are contacted. They are polar solvents (some are only slightly polar while others are more highly polar) and must not react with penicillin or cause it to decompose. They must be liquid and should not be too viscous at temperatures as low as about −5° C. They should exhibit a substantial selectivity for penicillin. Some suitable organic solvents are formates, acetates, propionates, butyrates, etc. containing from 4 to 8 carbon atoms such as n- or iso-propyl acetate, n- or iso-butyl acetate, amyl acetates, ethyl or propyl chloro acetate; lactates containing 5 to 10 carbon atoms, chloroform, ethylene dichloride, dimethyl phthalate, diethyl ether, diisopropyl ether, methyl propyl ketones, methyl isobutyl ketone, isophorone, etc.

It is desirable to use a solvent of relatively high polarity, such as amyl acetate, in the main extraction step, and to employ solvents of lower polarity but of high selectivity for penicillin in the other organic solvent extractions. Such solvents as methyl isobutyl ketone, dinormalbutyl ether, chloroform, etc., are particularly effective as selective solvents.

As already pointed out penicillin K may be removed along with the impurities, from penicillin G by practicing the present invention. However, if desirable, the impurities and penicillin K may be separated from penicillin G in separate operations. Thus, an aqueous solution containing penicillins G and K and any or all of the impurities A, B, C, and D may be acidified to precipitate the impurities, the impurities removed and the aqueous solution of penicillins G and K then either acidified to a lower pH to precipitate penicillin K, or solvent extracted to separate the penicillins from added acid and resulting salts, then aqueous extracted, and the resulting aqueous extract subsequently acidified to separate the penicillin K from the penicillin G.

We claim as our invention:

1. A process for the separation of penicillin G from penicillin K in a mixture thereof, which mixture contains penicillin K and penicillin G in relative amounts corresponding to a ratio of their respective potencies which is greater than about 0.18, which process comprises: preparing an aqueous solution of said mixture containing penicillin K in concentration in excess of that indicated by curve K of the drawing for a selected pH in the range 3 to 5; acidifying said aqueous solution to said selected pH to precipitate a portion of the penicillin K; and separating the resulting precipitate from the acidified aqueous solution, said separated acidified aqueous solution containing a major portion of the penicillin G and having a smaller ratio of K to G than that of said mixture.

2. The process according to claim 1 wherein the selected pH is not higher than about 4.

3. A process for the separation of penicillin G from penicillin K and acidic impurities normally associated with penicillin and of lower acidic strength than penicillin, in a mixture thereof, which mixture contains penicillin K and penicillin G in relative amounts corresponding to a ratio of their respective potencies which is greater than about 0.18, the improvement which comprises: preparing an aqueous solution of said mixture containing penicillin K in concentration in excess of that indicated by curve K of the drawing for a selected pH in the range 3 to 5; acidifying said aqueous solution to said selected pH, thereby precipitating a substantial proportion of the impurities without precipitating any substantial proportion of the penicillin K and the penicillin G; separating the resulting precipitate from the acidified aqueous solution containing the major proportion of the penicillin K and the penicillin G; subsequently acidifying an aqueous solution of the separated penicillin K and the penicillin G to a pH of not more than about 4 and lower than said selected pH to precipitate a substantial proportion of the penicillin K but without precipitating any substantial proportion of the penicillin G; and separating the resulting precipitate from the acidified aqueous solution, said separated acidified aqueous solution containing a major proportion of the penicillin G and having a smaller ratio of K to G than that of said mixture.

GINO J. PIEROTTI.
RAYMOND A. WILSON.
ELMER A. ANDERSON.

REFERENCES CITED

The following references are of record in the file of this patent:

Winthrop Reports—Summary on Penicillin, March 29, 1944, WI; pp. 1–4.

Abbott Report CMR–A–16, Dec. 15, 1944 (CPS–376), pp. 1 and 2.